United States Patent
Doddavula et al.

(10) Patent No.: US 10,574,748 B2
(45) Date of Patent: Feb. 25, 2020

(54) SYSTEMS AND METHODS FOR ALLOCATING ONE OR MORE RESOURCES IN A COMPOSITE CLOUD ENVIRONMENT

(71) Applicant: Infosys Limited, Bangalore (IN)

(72) Inventors: Shyam Kumar Doddavula, Bangalore (IN); Mudit Kaushik, Meerut (IN); Arun Vishwanathan, Bangalore (IN)

(73) Assignee: Infosys Limited, Bangalore (IN)

( * ) Notice: Subject to any disclaimer, the term of this patent is extended or adjusted under 35 U.S.C. 154(b) by 63 days.

(21) Appl. No.: 14/213,489

(22) Filed: Mar. 14, 2014

(65) Prior Publication Data
US 2014/0289412 A1    Sep. 25, 2014

(30) Foreign Application Priority Data
Mar. 21, 2013    (IN) .............................. 1235/CHE/2013

(51) Int. Cl.
*H04L 29/08*    (2006.01)
*H04L 12/24*    (2006.01)
*G06F 9/50*    (2006.01)

(52) U.S. Cl.
CPC ........ *H04L 67/1097* (2013.01); *G06F 9/5072* (2013.01); *H04L 41/5003* (2013.01); *H04L 67/322* (2013.01)

(58) Field of Classification Search
CPC ... H04L 67/32; H04L 67/322; H04L 67/1097; H04L 41/5003; G06Q 20/14; G06Q 20/145; G06Q 30/04; G07F 17/0021
See application file for complete search history.

(56) References Cited

U.S. PATENT DOCUMENTS

| | | | | |
|---|---|---|---|---|
| 5,619,695 A | * | 4/1997 | Arbabi | G06F 9/4881 718/100 |
| 6,859,926 B1 | * | 2/2005 | Brenner | G06F 9/5038 718/100 |
| 8,738,466 B1 | * | 5/2014 | Kirby | G06F 17/30864 705/26.5 |
| 2001/0039581 A1 | * | 11/2001 | Deng | G06F 9/5044 709/226 |
| 2006/0136761 A1 | * | 6/2006 | Frasier | G06F 9/505 713/320 |
| 2011/0016214 A1 | | 1/2011 | Jackson | |
| 2011/0161973 A1 | * | 6/2011 | Klots | G06F 17/30566 718/104 |
| 2011/0213712 A1 | | 9/2011 | Hadar et al. | |
| 2011/0213875 A1 | | 9/2011 | Ferris et al. | |
| 2012/0022910 A1 | | 1/2012 | Chi et al. | |
| 2012/0324092 A1 | * | 12/2012 | Brown | G06F 9/5044 709/224 |

(Continued)

*Primary Examiner* — Viet D Vu
(74) *Attorney, Agent, or Firm* — Pepper Hamilton LLP

(57) ABSTRACT

This technology relates to a device, method, and non-transitory computer readable medium for allocating one or more resources optimally in a composite cloud environment. This technology involves configuring organization and service level quota values, describing service composition, service unit, service level agreement, defining allocation model and resource allocation optimization algorithm. Based on these predefined rules the infrastructure, software and manual resources are assigned, future allocation is forecasted and resources are allocated to complete the service requests received from the users.

23 Claims, 5 Drawing Sheets

(56) References Cited

U.S. PATENT DOCUMENTS

| | | | |
|---|---|---|---|
| 2012/0330711 A1* | 12/2012 | Jain | G06Q 30/04 |
| | | | 705/7.23 |
| 2013/0080641 A1* | 3/2013 | Lui | G06F 9/505 |
| | | | 709/226 |
| 2013/0086235 A1* | 4/2013 | Ferris | G06F 9/505 |
| | | | 709/223 |
| 2013/0111034 A1* | 5/2013 | Upadhya | G06F 3/0605 |
| | | | 709/226 |
| 2013/0185413 A1* | 7/2013 | Beaty | G06F 9/5072 |
| | | | 709/224 |
| 2013/0275975 A1* | 10/2013 | Masuda | G06F 9/5077 |
| | | | 718/1 |
| 2014/0095693 A1* | 4/2014 | Apte | H04L 67/1008 |
| | | | 709/224 |
| 2014/0280441 A1* | 9/2014 | Jacobson | G06F 9/5027 |
| | | | 709/201 |
| 2015/0378786 A1* | 12/2015 | Suparna | G06F 9/5011 |
| | | | 718/104 |

* cited by examiner

SYSTEMS AND METHODS FOR ALLOCATING ONE OR MORE RESOURCES IN A COMPOSITE CLOUD ENVIRONMENT

This application claims the benefit of Indian Patent Application No. 1235/CHE/2013 filed Mar. 21, 2013, which is hereby incorporated by reference in its entirety.

FIELD

The present invention relates generally to allocating one or more resources in a cloud environment, and in particular, to a system and method for allocating one or more resources in a composite cloud environment.

BACKGROUND

Cloud computing is an emerging paradigm that enables delivering IT capabilities as services. The IT capabilities can include Infrastructure like servers, storage etc. or platforms like java, .NET application development platforms etc. or software like CRM etc. The cloud computing model is based upon pooling computer resources and sharing them across multiple consumers from different organizations or organization units and offering them on pay-per-use models. A typical enterprise cloud includes multiple resource pools with different technologies, across locations, in various data centers as well as multiple external cloud providers. A key requirement for enterprise clouds is a solution for managing cloud resource allocations so that the usage of cloud computing resources can be optimized. The complexities is optimization based on several factors like different costs associated with different internal resource pools, different pricing models for different external cloud providers, different constraints for different services, different SLAs for different service instances etc. The workloads are also dynamic so correspondingly the resource requirements keep changing so the resource management needs to enable such dynamic allocations.

Existing technologies do not address the requirements for optimization of resource allocations for composite cloud services like "Testing As A Service" that are a combination of infrastructure, software like testing tools and people driven manual services like manual testing by skilled testers and software developers.

In view of the foregoing discussion, there is a need for solution which can optimize the allocation of resources in a composite cloud service environment which not only include the infrastructure and software but also the manual services.

SUMMARY

The present technique overcomes all the above mentioned limitations by optimizing the allocation of one or more resources in a composite cloud service which include infrastructure resources, software resources and manual resources. The present technique supports several aspects regarding manual services, like onshore, offshore, near shore delivery of manual services, overtime pay, availability of skills, knowledge management and so on. This also takes into consideration dynamic aspects of cloud model like dynamic provisioning and re-provisioning of the one or more resources based on desired service SLAs, changing workloads and on-demand user requests for service instances. The present technique enables to reduce waste in resource allocations for composite cloud services and thus reduces costs. It also enables cloud providers meet SLAs of composite cloud services and improve customer satisfaction.

According to one embodiment of the present disclosure, a method for providing optimum allocation of one or more resources in a composite cloud environment is disclosed. The method includes receiving one or more composite cloud service requests from at least one user. Thereafter, the one or more resources are assigned for the one or more requests by determining a total number of the one or more resources required for serving the one or more requests based on one or more predefined rules and at least one user input received along with the one or more requests. In various embodiments of the present disclosure, the one or more resources include infrastructure resources, software resources and manual resources. After that, the real time consumption of the one or more assigned resources for the one or more requests is measured periodically. Further, the future consumption of the one or more resources required for serving the one or more requests is forecasted based on the at least one user input or one or more historical data or combination thereof. Then, the one or more requests are mapped with a predefined magnitude classification model and a combination matrix based on the forecast. Finally, the one or more resources are allocated by combining the one or more mapped requests based on the one or more predefined rules, wherein the one or more combined requests at a time consume all the one or more resources available in the composite cloud environment.

In an additional embodiment, a system for providing optimum allocation of one or more resources in a composite cloud environment is disclosed. The system includes a user request receiving module, a resource distribution manager, a resource usage monitor module, a metering module, a proactive resource management module, a resource allocation module and a repository. The user request receiving module is configured to receive one or more composite cloud service requests from at least one user. The resource distribution manager is configured to distribute the one or more resources to serve the one or more composite cloud service requests based on one or more predefined rules. The resource usage monitor module is configured to monitor consumption of the one or more resources based on one or more predefined rules, wherein the one or more resources include infrastructure resources, software resources and manual resources. The metering module is configured to calculate an amount of consumption of the one or more resources at a service level, an environment level and an organization level. The proactive resource management module is configured to forecast future consumption of the one or more resources based on the at least one user input or one or more historical data related to the one or more resource consumption or combination thereof. The resource allocation module is configured to allocate the one or more resources for the one or more composite cloud service requests based on a predefined magnitude classification model, combination matrix and resource allocation optimization algorithm and the repository is configured to store the one or more predefined rules and consumption information of the one or more resources.

In another embodiment, a computer program product for providing optimum allocation of one or more resources in a composite cloud environment is disclosed. The computer program product includes a computer usable medium having a computer readable program code embodied therein for providing optimum allocation of one or more resources in a composite cloud environment. The computer readable program code storing a set of instructions configured for receiving one or more composite cloud service requests from at least one user, assigning the one or more resources for the one or more requests by determining a total number of the one or more resources required for serving the one or more requests based on one or more predefined rules and at least one user input received along with the one or more requests, measuring real time consumption of the one or more assigned resources for the one or more requests periodically, forecasting future consumption of the one or more assigned resources for the one or more requests based on the at least one user input or one or more historical data or combination thereof, mapping the one or more requests based on the forecast with a predefined magnitude classification model and a combination matrix and allocating the one or more resources by combining the one or more mapped requests based on the one or more predefined rules.

DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a system and method for providing optimum allocation of one or more resources in a composite cloud environment. This involves capturing organization level and cloud service level SLAs (Service Level Agreements), resource requirements, constraints and priority level. This also involves defining allocation models for service types. After defining all these rules the user request for service instances are received and resource usage and SLA adherence for all service instances are measured and forecasted. The resource allocations are periodically calculated. Further, minimum resources in terms of infrastructure, software and people and the least time required to meet SLAs are calculated and those resources are reserved for each service level. Additionally it involves provisioning available free resources based on priority and if enough resources are not available, de-provisioning or re-allocating lower priority services of organizations subject to reservations and constraints and free up resources needed.

Figure 1:
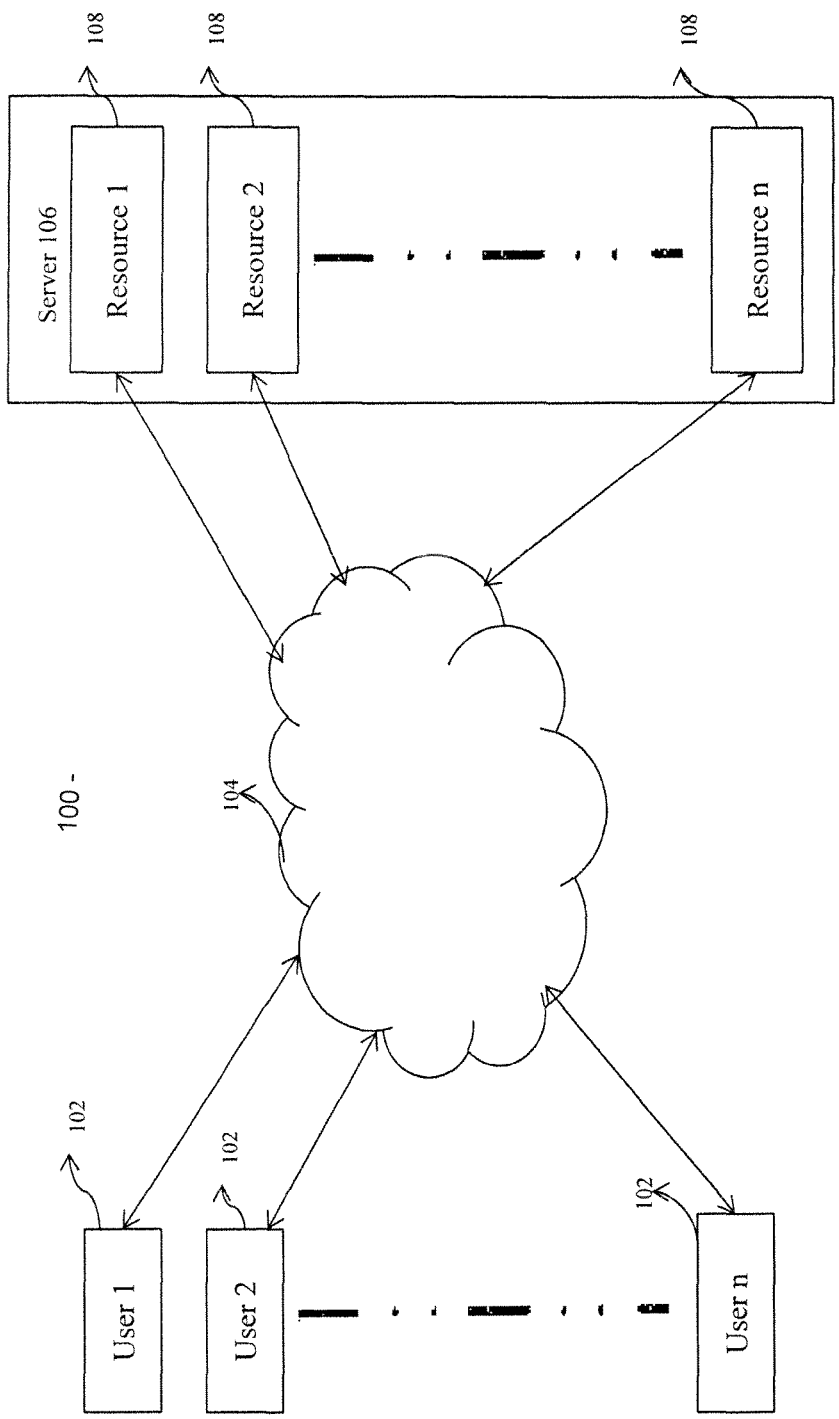
FIG. 1 illustrates an environment in which various embodiments of the invention presented herein may be practiced.

FIG. 1 illustrates an environment 100 in which various embodiments of the invention presented herein may be practiced. This involves users 102, cloud environment 104 and server 106. The server 106 contains resources 108 which are assigned to serve the user requests for composite cloud service. In various embodiments of the present disclosure, the resources include infrastructure resources, software resources and manual resources.

Figure 2:
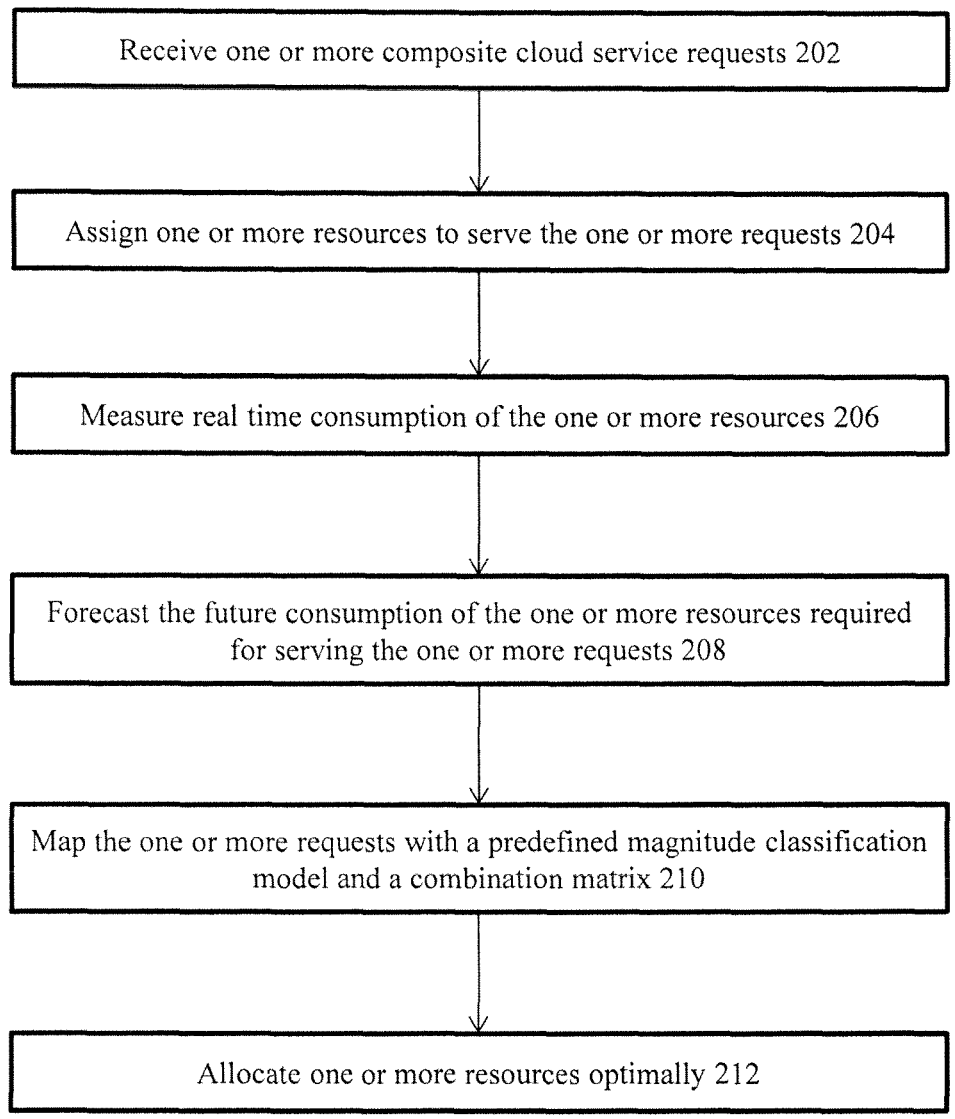
FIG. 2 is a flowchart, illustrating a method for providing optimum allocation of one or more resources in a composite cloud environment, in accordance with an embodiment of the present invention.

FIG. 2 is a flowchart, illustrating a method for providing optimum allocation of one or more resources in a composite cloud environment, in accordance with an embodiment of the present invention. The one or more composite cloud service requests (also termed as user requests) are received at the server 106, as in step 202. Optionally the user requests may have start date and end date specified. The user can request for service instance by just providing SLAs and the service input data. For example, the user can mention that an "Application As a Service" instance is needed where in the "peak load" it is expected to support is 100 requests/second and the "response time" should be less than 3 seconds. The above example is provided only for understanding purpose and not intended to limit the scope of the disclosure. Based on these inputs the number of composite cloud service units and the underlying infrastructure, software and manual service units can be calculated automatically or user can specify the number of composite cloud service units and the underlying infrastructure, software and manual service units needed. An exemplary request with sample value is provided in Table 1 below.

TABLE 1

| Service Unit | Infrastructure unit | Software unit | Priority | Constraint |
| --- | --- | --- | --- | --- |
| Small Testing as a service unit | 2 "small VM" | "TestSmall Stack" with Application Server | 2 | $Vdc_1 + Vdc_2$ |

Figure 3:
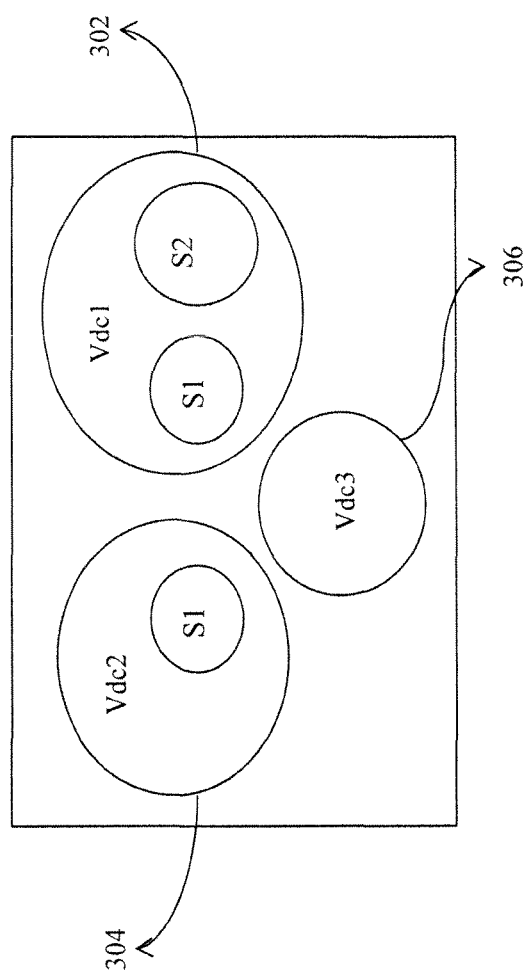
FIG. 3 depicts a service level constraint, in accordance with an embodiment of the present invention.

The priority value as shown in table 1 is used to settle the criticality of the service in case of resource crunch. The constraint value in Table 1 is used to capture the SLA requirement of restricting a particular service from using the resources of the particular cloud. FIG. 3 depicts a service level constraint, in accordance with an embodiment of the present invention. FIG. 3 represents three different clouds or virtual data centers in a multicloud system, i.e. $Vdc_1$ 302, $Vdc_2$ 304 and $Vdc_3$ 306. As shown in FIG. 3 the service $S_1$ can consume resources of cloud or virtual data centers $Vdc_1$ 302 and Vdc$_2$ 304 but the service S$_2$ can only survive on the resources contributed by cloud or virtual data center Vdc$_1$ 302.

Referring back to FIG. 2, the one or more resources are assigned to serve the one or more requests, as in step 204. The one or more resources are assigned by determining the minimum number of the one or more resources required to serve the request based on one or more predefined rules and the inputs received from the user along with the user requests. According to an embodiment of the present disclosure, the user input may include a number of the one or more resources required or a service type description or a time to complete the one or more requests or combination thereof. The one or more predefined rules include organization level quota values, environment level quota values, service composition description, service unit description, service level agreement (SLA) description, allocation model definition and resource allocation optimization algorithm, each of these are described in detail below.

Organization Level Quota Value Configuration:

The management of resources at the organization or tenant level done in terms of organization's or tenant's quota values defined in terms of minimum requirement of the total resources, the ceiling value or the maximum level of the total resources which can be consumed by the organization or tenant. An exemplary table of organization level quota values is mentioned in Table 2 below. This table is mentioned for understanding purpose and is not intended to limit the scope of the disclosure.

TABLE 2

| Organization or tenant name | Minimum value (Min) [%] | Maximum value (Max) [%] | Priority [1 to 5] |
|---|---|---|---|
| Organization one | 20 | 30 | 1 |
| Organization two | 5 | 40 | 2 |
| Organization three | 5 | 30 | 3 |

The organization or tenant name in Table 2 refers to the name of the organization or the tenant. Minimum value ($O_{Min}$) as defined in the table 2 refers to the organization's or tenant's minimum requirement of the resources. The minimum value is defined in the percentage value of the total resources of the cloud. This total resources of the cloud is equivalent to the summation of all the virtual data centers existing on the cloud i.e.

$$\text{Total Resources of the Cloud} = \sum_{i=0}^{n} Vdc_i$$

Where, Vdc=Virtual data center. These virtual data centers can be merged by similar or different hyper visors. The maximum value ($O_{Max}$) as defined in the table 2 refers to the permitted ceiling value which can be consumed by the specific organization or tenant in any case. Again this maximum value is the percentage value of the total resources of the cloud. The priority as mentioned in table 2 is defined in terms of numeric value 1 referring highest to 5 referring lowest preeminence of the organization or tenant on the cloud. This priority value is used to settle the criticality of the tenant in case of resource crunch.

Environment Level Quota Value Configuration:

Every organization or tenant can setup different environments to create the specialized platforms in it. These environments not only compartmentalize the resources but also provide a clean way to categorize the service as per their types. The environment level quota values are assigned in terms of maximum value, minimum value, priority and constraint. An exemplary table showing the environment level assignment is given below in Table 3. This table is mentioned for understanding purpose and is not intended to limit the scope of the disclosure.

TABLE 3

| Environment name | Minimum value (Min) [%] | Maximum value (Max) [%] | Priority [1 to 5] | Constraint |
|---|---|---|---|---|
| E$_1$ (Test) | 5 | 30 | 2 | Vdc$_1$ + Vdc$_2$ |
| E$_2$ (Production) | 15 | 30 | 5 | Vdc$_2$ |

The environment name as mentioned in Table 3 refers to the name of the specialized platform. The Minimum vale ($E_{Min}$) as mentioned in Table 3 refers to the environment's minimum requirement of the resources. This value is percentage of the minimum total resources allocated to the particular organization ($O_i$) to which this environment belongs to.

Environment level Minimum value ($E_{Min}$)=Percentage of the $O_{Min}$

The maximum value ($E_{Max}$) as mentioned in Table 3 refers to the percentage of the total resources allocated to the particular organization or tenant in which the environment is created.

Environment level Maximum value ($E_{Max}$)=Percentage of the $O_{Max}$

The priority as mentioned in Table 3 is defined in terms of numeric value 1 reflecting highest to 5 lowest preeminence of the environment in the organization or tenant on the cloud. This priority value is used to settle the criticality of the environment in case of resource crunch. The constraint value as mentioned in Table 3 is to capture the SLAs requirement of restricting a particular environment from using the resources of the particular cloud or virtual data center. As mentioned in the table 3 above, environment E$_1$ can consume the resources of Vdc$_1$ and Vdc$_2$ but E$_2$ can only survive on the resources contributed by Vdc$_2$ in the multi-cloud system.

Service Composition Description:

The service composition captures infrastructure, software and manual service units, the deployment architecture, the software components and so on. The various software components that are needed for the composite service are defined. The example may include but not limited to a composite cloud service like "Testing as a service" the required software components like web server, application server, database server, load testing, functional testing tool and so on. In case of service infrastructure description the administrator defines the infrastructure requirements, the desired deployment architecture of the software components and the infrastructure, the network configuration and so on. This deployment architecture can be selected from predefined deployment architecture templates or can be created through the combination of selected components available for the type of the service. In case of service manual skill description, the manual skills and associated constraints, the knowledge management aspects and the manual process are defined.

Service Unit Description:

A composite service unit is defined so that it is easier to provision and also to measure usage. Units are also defined for the components like infrastructure, software and manual service. An example of the infrastructure unit may include but not limited to a "Small VM" which comprises 1 CPU Core with 2.75 GHz equivalent CPU, 512 MB RAM, 10 GB hard disk, 1 gbps NIC card. The example of software unit may include but not limited to "Small Stack" which comprises 1 web server, 1 application server, 1 database server software for 1 CPU license, load testing tool software for 100 concurrent users and functional testing tool software for 1 CPU. The example of manual unit may include but not limited to "Small test service unit" which can be defined with 10 function points worth of manual testing service. The example of time unit may include but not limited to 1 hour unit.

SLAs Description:

The SLA description captures the SLA parameters. For example, in case of "testing as a Service" the SLA description can be something like the time by when it is needed to be completed and/or the expected code coverage" and so on.

Allocation Model Definition:

To address the needs of various users and at the same time to enable optimization of utilization of the resources, multiple allocation models are defined. These allocation models are predefined and can be customized further to incorporate the needs of the user. This disclosure has three allocation models named as Fixed Service Allocation Model, Fixed Service Unit Allocation Model and Negotiation Model. These models work on different method of allocation or reservation of the resources to render a desired service. The different models are described herein below.

Fixed Service Allocation Model: This model suits to the need of continuous and dedicated service requirement. This model is based on the direct demand and pure allocation of the resources without considering any further automated resource optimization. For the invocation of this model the main input required from the user end in the SLA is the duration i.e. the time period for which the complete service is required. Once the duration is assigned and the model is invoked, the system will allocate or reserve the resources as per the SLAs other parameters like priority of the service and constraints associated with it.

Fixed Service Unit Allocation Model: This allocation model is the economical and based on the optimum utilization of the available resources. This model is the translation of the need where only the final outcome of the service in a stipulated time is required over the continuous service rendering. In this model the user defines one additional parameter in the SLA which captures the "end date" by which the service result should be generated. The "end date" parameter works as the deadline for completing the service outcome processing. Hence, in this model the user doesn't claim over the resources of the cloud system making the system's resource manager authoritative enough to optimize the resources as per its logical discretion.

Negotiation model: This model works on the dynamics of the demand and supply of the resources on the multi-cloud multi-tenant setup. The user can place their bids for the desirable service on the auction portal of the system. This model simply allocates the resources when the availability as well as the cost of the service rendered matches to the bid of the user.

Referring back to FIG. 2, the real time consumption of the one or more resources are measured, as in step 206. The resource consumption is measured periodically like every one hour for all the existing services at the individual service level as well as with aggregation to the organization or tenant levels. These values are in the form of CPU consumption, Disk consumption, Network consumption etc for infrastructure resources. It can be in the form of number of software licenses used for software and it can be manual effort spent in person hours for manual services. The organization level resource consumption is calculated through aggregation of the service level resource consumption.

Org level resource consumption $$O_{RC} = \sum_{i=0}^{n} S_{RC_i}$$

The above equation means if the organization $O_1$ is hosting services $S_1$ and $S_2$ then the organization level resource consumption for $O_1$ will be equal to the aggregation of the resource consumed by the service $S_1$ and $S_2$. i.e.

$$O_{RC} = \sum_{i=1}^{2} S_{RC_i}$$

The future consumption of the resources in terms of infrastructure, software and people is forecasted based on user input and/or historical data, as in step 208. In this step the SLAs are translated into the number of composite cloud service units needed and the underlying infrastructure, software and manual service resource units. The infrastructure allocation is considered as the basic allocation of the resources because rest of the resources will be allocated accordingly. Historical data is maintained for resource usage as well as for the workload. Using this data and applying a forecaster based on techniques like linear regression, future workload and infrastructure usage is predicted and accordingly CPU, memory, RAM and so on can be reserved and allocated for the specific services. After the resource allocation for the infrastructure component is done the system triggers the second level of resource allocation i.e. for the software components. At this level the SLA has to match the reservation and invocation of the software licenses for the required hardware and expected workload for the same duration. After resolving and allocating the resources at the infrastructure and software levels, the system determines the amount of manual effort needed, the skill set needed, determines the appropriate people and allocated them. As all these service components are dependent on each other a resource allocation algorithm that optimizes allocation of them simultaneously is defined. The algorithm used for the simultaneous optimization is described below for different scenarios:

First approach: If the Multi-Cloud Multi-Tenant cloud setup has numerous clouds or resource pools then the resource allocation optimization can be done at each cloud individually. In this approach the consolidated service requests are stored on the basis of "constraint" parameter defined in the SLA and then the resource allocation optimization algorithm is applied. So, the steps in this approach are:

a) All the consolidated service requests are sorted on the basis of the SLA's constraint parameter. For example, if the consolidated service requests and their constraint values are like the values mentioned in the table 4 below,

TABLE 4

| Consolidated Service Request | Constraint |
|---|---|
| $S_1$ | $Vdc_1 + Vdc_2$ |
| $S_2$ | $Vdc_2$ |
| $S_3$ | $Vdc_2 + Vdc_3$ |
| $S_4$ | $Vdc_1$ |
| $S_5$ | $Vdc_2$ |
| $S_6$ | $Vdc_1$ |
| $S_7$ | $Vdc_3$ | then these services will be sorted on the basis of their constraint values as shown in table 5 below:

TABLE 5

| $Vdc_1$ | $Vdc_2$ | $Vdc_3$ |
|---|---|---|
| $S_1$ | $S_2$ | $S_7$ |
| $S_6$ | $S_1$ | $S_3$ |
| $S_4$ | $S_3$ | | b) In the second step the resource allocation optimization theorem will be applied which will be discussed in details herein below.

Second approach: if the Multi-Cloud Multi-Tenant Cloud wants to consider all the clouds or resource pools as a single cloud then the resource allocation optimization can be done assuming all the pools as an aggregated cloud. In this approach it is not required to sort the consolidated service requests on the basis of their SLA's parameter constraint value but the resource allocation optimization algorithm can be directly applied.

Resource Allocation Optimization Algorithm:

This algorithm is time based where the resources are allocated by finding the complementary matches to each consolidated service request with consideration to its requirement in terms of infrastructure units (VMs), software units (licenses) and manual units (manual effort). The SLA parameters defined as priority and constraints are also taken care of during the complete process of resource allocation optimization. The steps involved in the algorithm are described below:

I) All the consolidated service requests are sorted according to their priority mentioned during the SLA description. An exemplary table of sorted consolidated service requests is given below:

TABLE 6

| Consolidated Service Request | Priority |
|---|---|
| $S_1$ | 1 |
| $S_2$ | 1 |
| $S_3$ | 3 |
| $S_4$ | 3 |
| $S_5$ | 5 |
| $S_6$ | 1 |
| $S_7$ | 3 |

The sorted table after step I example of the resource allocation optimization algorithm will be:

TABLE 7

| Priority | 1 | 3 | 5 |
|---|---|---|---|
| | $S_1$ | $S_3$ | $S_5$ |
| | $S_2$ | $S_4$ | |
| | $S_6$ | $S_7$ | |

II) Then, all the consolidated service requests are considered as a three dimensional entity with dimension representation of infrastructure units, software units and manual service units and the time (t) needed to complete the service is taken into account while allocating the resources.

For example, if there are three composite service requests $S_1$, $S_2$ and $S_3$ with equal priority (like 1). These composite service requests finally translate into the request to allocate resources in form of infrastructure units, software units and manual units and hence can be called as a three dimensional entity. The exemplary table of translated consolidated service requests can be represented as below:

TABLE 8

| Service name | Infrastructure Units | Software Units | Manual service units | Time needed to complete (t unit) |
|---|---|---|---|---|
| $S_1$ | 75 | 45 | 25 | 1 |
| $S_2$ | 40 | 40 | 40 | 1 |
| $S_3$ | 25 | 55 | 75 | 1 |

A magnitude classification model is defined at this stage. A simple range based magnitude classification can be made or Fuzzy logic can be applied for mapping values to the states. The magnitude classification model comprises a pairing of declared magnitude name (or state) with a defined distribution interval. Magnitudes (or states) may be declared as representing levels of utilization of the resources, e.g., full, large, medium and small. The distribution intervals in the MCM may be varied to change the granularity. As a representative example, a simple range based classification model with four levels of uniform distribution intervals can be as below:

TABLE 9

| States | Ranges (%) |
|---|---|
| Full (F) | $75 < \text{to} \leq 100$ |
| Large (L) | $50 < \text{to} \leq 75$ |
| Medium (M) | $25 < \text{to} \leq 50$ |
| Small (S) | $0 \leq \text{to} \leq 25$ |

According to table 9, if the resource allocation is between 76% to 100%, then it'll be considered as Full, if resource allocation is between 51% to 75% then it'll be considered as Large, if resource allocation is between 26% to 50% then it'll be considered as Medium and if resource allocation is between 0% to 25% then it'll be considered as Small.

III) A combination matrix is created based on the magnitude classification model. The dimensions of the matrix are the number of the possible combinations, defined by the number of dimensions and number of distribution intervals being considered. The number of total combinations is $m^n$, where m equals the number of distribution intervals and n equals the number of dimensions. For example, referring to table 9, the possible total number of combinations will be $4^3=64$ as there are 4 distribution tables (F, L, M and S) and 3 dimensions, i.e. infrastructure resources, software resources and manual resources, the possible combination matrix for table 9 will be as follows:

$$\begin{pmatrix} FFF, FFL, FFM, FFS, FLF, FLL, FLM, FLS, FMF, FML, FMM, FMS, FSF, FSL, FSM, FSS \\ LFF, LFL, LFM, LFS, LLF, LLL, LLM, LLS, LMF, LML, LMM, LMS, LSF, LSL, LSM, LSS \\ MFF, MFL, MFM, MFS, MLF, MLL, MLM, MLS, MMF, MML, MMM, MMS, MSF, MSL, MSM, MSS \\ SFF, SLF, SFM, SFS, SLL, SLM, SLS, SMF, SML, SMM, SMS, SSF, SSL, SSM, SSS \end{pmatrix}$$

IV) Once magnitude classification model and combination matrix is defined, all resource allocation requests are mapped with the magnitude classification model and the combination matrix, as in step 210 of FIG. 2. For example a consolidated service request with infrastructure units required (VMs), software units required (software licenses) and manual service snits required (manual effort) of FFF will be mapped to position (0,0) and with infrastructure units required (VMs), software units required (software licenses) and manual service snits required (manual effort) of FFL will be mapped to position (0,1) and so on and so forth. The counts of workloads mapped to each position as well as the list of all workloads mapped to each position is maintained.

V) In this stage, the resources are allocated optimally, as in step 212 of FIG. 2. To achieve this, the mapped consolidated service requests into the matrix are combined based on the below rules:

Rule 1: All the combined consolidated service requests which comprises F is eliminated and assigned individually as it means that one of the combine consolidated service requests is full and hence that combine consolidated service requests can not be combined with any other combine consolidated service requests further.

Rule 2: The rest of the consolidated service requests at position (i,j) of the combination matrix starting with i=0 and j=0 are combined with the consolidated service requests at (n-i, n-j) where matrix size is (n,n). It is required to keep incrementing i to n and j to n. The combination rules described in the below table can be used:

TABLE 10

| Magnitude | Possible | Elevated to Next level |
|---|---|---|
| Full (F) | No Combination possible as its considered to be over assigned i.e no capacity to consolidate | — |
| Large (L) | 1. With Small (S) | Large (L) + Small (S) = Full (F) |
| | | Large (L) + Medium (M) = Full (F) |
| Medium (M) | 1. With Medium (M) | Medium (M) + Medium (M) = Full (F) |
| | 2. With Small (S) | Medium (M) + Small (S) = Large (L) |
| Small (S) | 1. With Large (L) | Small (S) + Large (L) = Full (F) |
| | 2. With Medium (M) | Small (S) + Medium (M) = Large (L) |
| | 3. With Small (S) | Small (S) + Small (S) = Medium (M) |

For example, in case of Table 8, the system can allocate the resources to the consolidated service request $S_1$ (75, 45, 25) and $S_3$ (25, 55, 75) because they can be created at the same time without encroaching on each other resources, as mentioned in table 11 below.

TABLE 11

| | | | |
|---|---|---|---|
| $S_1$ | 75 | 45 | 25 |
| $S_3$ | 25 | 55 | 75 |
| Total | 100 | 100 | 100 |

As during the execution of service $S_1$ and $S_3$ all the resources are exhausted up to 100% level (as shown in table 11) thus the consolidated service request $S_2$ cannot be accommodate in the same time period. According to the priority and constraints defined in the service $S_2$ will be getting the resource allocation in some other time period.

According to an embodiment of the present disclosure, the process of de-provision and re-allocation is applied in the event of any resource crunch resulting into non availability of the free resources to provision a higher priority service.

De-Provision Process: In this process some other service in the same organization but with the lesser priority value and in the same cloud/Vdc, holding the equivalent or lesser amount of resources is de-provisioned. If the resources freed from the de-provisioning of the service is sufficient to meet the SLA requirements of the higher priority service than they are allocated to the higher priority service else some more lesser priority services are de-provisioned in the same way as mentioned above.

For example: If organization $O_1$ is hosting services $S_1$, $S_2$ and $S_3$ with priority 1, 2 and 3 respectively, on the cloud/Vdc $Vdc_1$. And the Service Level Quota Management table is—

| Service Name | Minimum Value (Min) [%] | Maximum Value (Max) [%] | Priority [1 to 5] | Constraint |
|---|---|---|---|---|
| $S_1$ | 5 | 10 | 1 | $Vdc_1$ |
| $S_2$ | 80 | 85 | 2 | $Vdc_1 + Vdc_2$ |
| $S_3$ | 15 | 30 | 3 | $Vdc_1$ |

Now a new service $S_4$ with priority 1 and constraint value as $Vdc_1$ need to be provisioned.

| | | | | |
|---|---|---|---|---|
| $S_4$ | 90 | 100 | 1 | $Vdc_1$ |

But all the resources allocated to $O_1$ are already been acquired by services $S_1$, $S_2$ and $S_3$. So in this case the De-provision process will be invoked in this way—

1. All the services under the organization $O_1$ with lesser priority in compare to the priority of new service $S_4$ will be listed—, $S_2$ and $S_3$
2. Now first the lowest priority service will de-provisioned to free some resources. So in this case the service $S_3$ will be de-provisioned. This de-provisioning will free the resources on $Vdc_1$ in the tune of 15% (minimum value).
3. But the requirement of the service $S_4$ is much more than what is freed through the de-provisioning of the service $S_3$. So another service with next lowest priority i.e $S_2$ will be de-provisioned which will finally release resource in tune of 80% (minimum value).
4. Now after the de-provisioning of the two lower priority service the total free resources shoots up to the level of 15+80=95%.
5. Hence the service $S_4$ can be provisioned by allocating it the required 90% (minimum value) on the cloud/Vdc $Vdc_1$.

Re-Allocation Process: In the above mentioned case the other way to release the resources for the higher priority service could be done by relocating the lesser priority service on the other cloud/Vdc subject to its' constraint value.

For example: In the above mentioned example the service S2 has the given SLA

| $S_2$ | 80 | 85 | 2 | $Vdc_1$+ $Vdc_2$ |
|---|---|---|---|---| i.e the service $S_2$ can be hosted on the $Vdc_1$ or $Vdc_2$ or on both. So in case if the resources are available on the $Vdc_2$ than resources on $Vdc_1$ can be freed by migrating the $S_2$ on $Vdc_2$. This process of re-allocation of the service will not only free the required resources on the desired cloud/Vdc but also prevent the de-provisioning of the service. Hence the re-allocation process is invoked when the constraint values allows the same.

Figure 4:
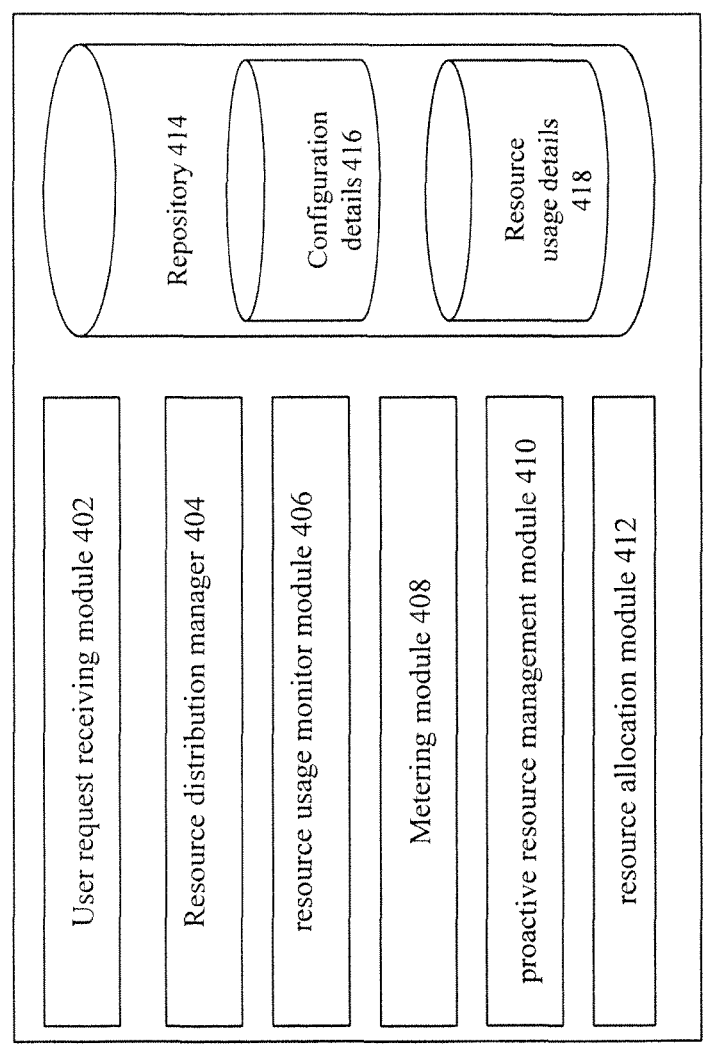
FIG. 4 is a block diagram illustrating a system for providing optimum allocation of one or more resources in a composite cloud environment, in accordance with an embodiment of the present invention.

FIG. 4 is a block diagram illustrating a system for providing optimum allocation of one or more resources in a composite cloud environment, in accordance with an embodiment of the present invention. Broadly, the system is a computing device with a processor and a memory, such as the one illustrated by way of example only in FIG. 5, which includes User request receiving module 402, resource distribution manager 404, resource usage monitor module 406, metering module 408, proactive resource management module 410, resource allocation module 412 and repository 414 comprising Configuration details 416 and Resource usage details 418. The user request receiving module 402 is configured to receive one or more composite cloud service requests (also termed as user requests). The different types of user requests are described in detail herein above. The resource distribution manager 404 is configured to distribute the one or more resources to serve the one or more composite cloud service requests based on predefined rules as described in detail herein above. The resource distribution manager 404 comprises organization resource distribution manager and service resource distribution manager. The organization resource distribution manager is instrumental in distributing and synchronizing the available resources among the multiple organization/tenants. The basic functionality of this component is logical compartmentalization of the available resources to abide the SLAs. The service resource distribution manager distributes and synchronizes the available resources among the multiple services. The resource usage monitor module 406 is configured to monitor consumption of the one or more resources. The resource usage monitor module 406 comprises organization resource usage monitor module and service resource usage monitor module. The organization resource usage monitor module helps in continuous and demand driven monitoring of the resource usage at the organization level and service resource usage module helps in continuous and demand driven monitoring of the resource usage at the service level. The metering module 408 automates the process of calculating the resource consumption at different levels, like at service level, environment level and organization level. The proactive resource management module is configured to forecast the resource usage of the existing services as described in detail herein above. It works on the historical data and pattern with mathematical algorithm to predict the resource usage. The resource allocation module 412 is configured to allocate the resources for the service requests based on a predefined magnitude classification model, combination matrix and resource allocation optimization algorithm as described herein above in detail. The repository 414 is configured to store the predefined rules and consumption information of the resources. The repository 414 includes configuration details 416 and resource usage details 418.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like.

Figure 5:
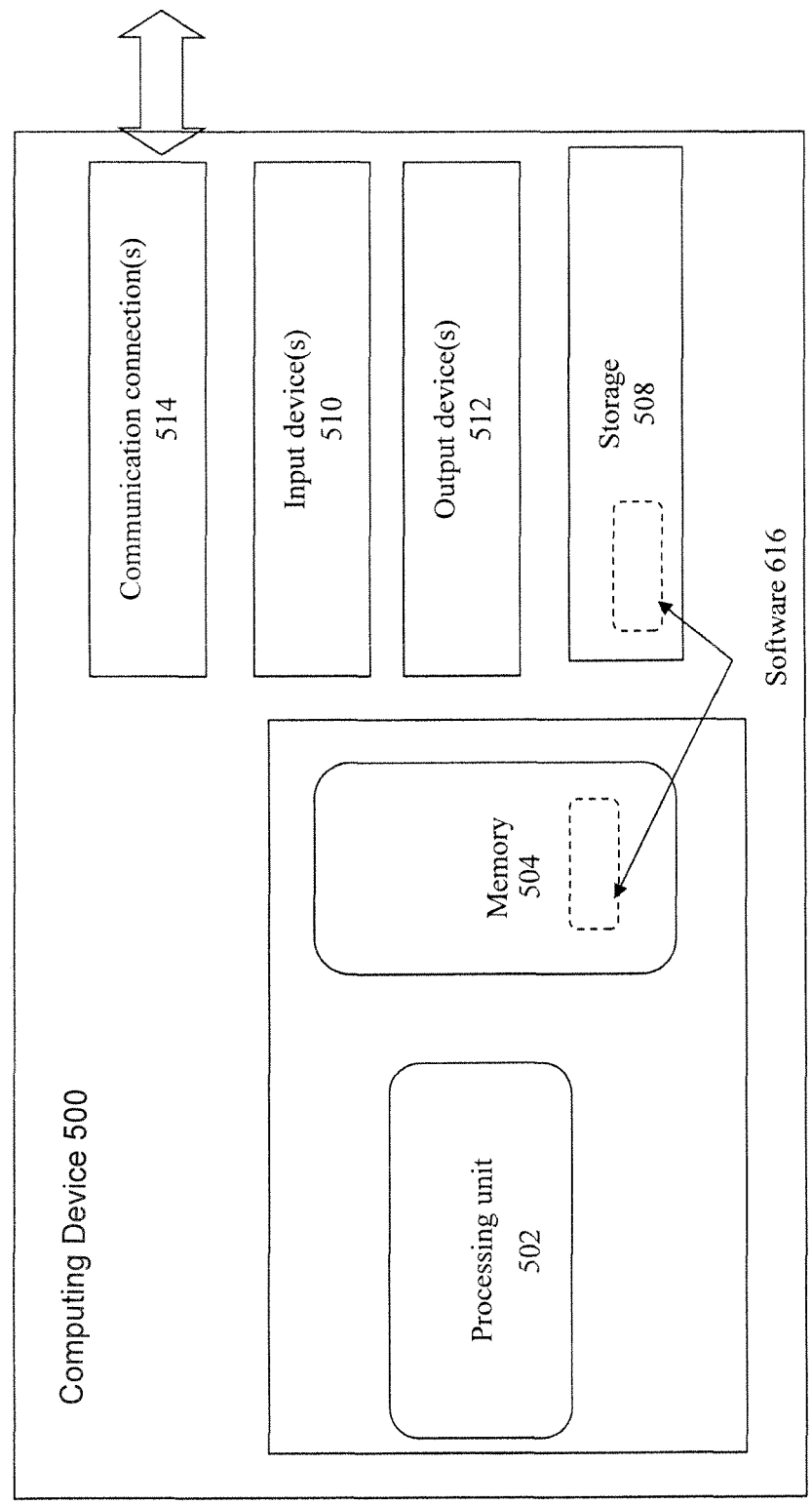
FIG. 5 is a computer architecture diagram illustrating a computing system capable of implementing the embodiments presented herein.

With reference to FIG. 5, the resource allocation management computing device 500 includes at least one central processing unit 502 and memory 504. The central processing unit 502 executes computer-executable instructions. In a multi-processing system, multiple processing units execute computer-executable instructions to increase processing power and as such, multiple processors can be running simultaneously. The memory 504 may be volatile memory (e.g., registers, cache, RAM), non-volatile memory (e.g., ROM, EEPROM, flash memory, etc.), or some combination of the two. The memory 504 stores software 516 that can implement the technologies described herein. The computing device 500 may have additional features. For example, the computing device 500 includes storage 508, one or more input devices 510, one or more output devices 512, and one or more communication connections 514. An interconnection mechanism (not shown) such as a bus, a controller, or a network, interconnects the components of the computing device 500. Typically, operating system software (not shown) provides an operating environment for other software executing in the computing device 500, and coordinates activities of the components of the computing device 500.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A method for providing optimum allocation of one or more resources in a composite cloud environment comprising:
- receiving, by a resource allocation management computing device, one or more composite cloud service requests from at least one user;
- assigning, by the resource allocation management computing device, the one or more resources for the one or more requests by determining a total number of the one or more resources required for serving the one or more requests based on one or more predefined rules and at least one user input received along with the one or more requests, wherein the one or more resources comprise manual resources;
- measuring, by the resource allocation management computing device, real time consumption of the one or more assigned resources for the one or more requests periodically, wherein the real time consumption further comprises a CPU consumption, a disk consumption and a network consumption;
- forecasting, by the resource allocation management computing device, future consumption of the one or more resources required for serving the one or more requests based on the at least one user input and historical data;
- mapping, by the resource allocation management computing device, the one or more requests based on the forecast with a combination matrix created based on a number of the one or more resources and number of distribution intervals;
- allocating, by the resource allocation management computing device, the one or more resources by combining the one or more mapped requests based on the one or more predefined rules, wherein the one or more combined requests at a time consume all the one or more resources available in the composite cloud environment, wherein the one or more predefined rules comprises one or more organization level quota values which set a maximum and minimum number of the one or more resources required for an organization and a priority value of the organization; and
- deprovisioning, by the resource allocation management computing device, the allocated one or more resources based on priorities assigned to the one or more resources until a resource requirement threshold associated with the one or more requests is exceeded.

2. The method as claimed in claim 1, wherein the one or more predefined rules comprise one or more environment level quota values for an environment of an organization which set a maximum and minimum number of the one or more resources allocated to the said organization required to provide service in the said environment, a priority value for the environment or a constraint value.

3. The method as claimed in claim 1, wherein the one or more predefined rules comprise a service composition description which comprises description related to one or more service software requirements, service infrastructure requirements or service manual effort requirements.

4. The method as claimed in claim 1, wherein the one or more predefined rules comprise a service unit description which comprises description related to an infrastructure unit, a software unit, a manual effort unit or a time unit.

5. The method as claimed in claim 1, wherein the one or more predefined rules comprise an allocation model definition which comprises a fixed service allocation model definition, a fixed service unit allocation model definition or negotiation model definition.

6. The method as claimed in claim 1, wherein the one or more predefined rules comprise a resource allocation optimization algorithm which combines the one or more requests not having a highest classification of a range of classifications, to form the highest classification.

7. The method as claimed in claim 1, wherein the at least one user input comprises a number of the one or more resources required or a service type description or a time to complete the one or more requests or combination thereof.

8. The method as claimed in claim 1, wherein the one or more requests are sorted based on a priority value of the one or more requests.

9. The method as claimed in claim 1, wherein the one or more resources are reallocated based on one or more requirements and the priority value of the one or more requests.

10. The method as claimed in claim 1, wherein the magnitude classification model is generated either by using a range based classification or a fuzzy logic.

11. A resource allocation management computing device comprising:
- at least one processor; and
- at least one memory coupled to the processor configured to execute programmed instructions stored in the memory comprising:
  - receiving one or more composite cloud service requests from at least one user;
  - assigning the one or more resources for the one or more requests by determining a total number of the one or more resources required for serving the one or more requests based on one or more predefined rules and at least one user input received along with the one or more requests, wherein the one or more resources comprise manual resources;
  - measuring real time consumption of the one or more assigned resources for the one or more requests periodically, wherein the real time consumption further comprises a CPU consumption, a disk consumption and a network consumption;
  - forecasting future consumption of the one or more resources required for serving the one or more requests based on the at least one user input and historical data;
  - mapping the one or more requests based on the forecast with a combination matrix created based on a number of the one or more resources and number of distribution intervals;
  - allocating the one or more resources by combining the one or more mapped requests based on the one or more predefined rules, wherein the one or more combined requests at a time consume all the one or more resources available in the composite cloud environment, wherein the one or more predefined rules comprise one or more organization level quota values which set a maximum and minimum number of the one or more resources required for an organization and a priority value of the organization; and
  - deprovisioning the allocated one or more resources based on priorities assigned to the one or more resources until a resource requirement threshold associated with the one or more requests is exceeded.

12. The device as claimed in claim 11, wherein the one or more predefined rules comprise one or more environment level quota values for an environment of an organization which set a maximum and minimum number of the one or more resources allocated to the said organization required to provide service in the said environment, a priority value for the environment or a constraint value.

13. The device as claimed in claim 11, wherein the one or more predefined rules comprise a service composition description which comprises description related to one or more service software requirements, service infrastructure requirements or service manual effort requirements.

14. The device as claimed in claim 11, wherein the one or more predefined rules comprise a service unit description which comprises description related to an infrastructure unit, a software unit, a manual effort unit or a time unit.

15. The device as claimed in claim 11, wherein the one or more predefined rules comprise an allocation model definition which comprises a fixed service allocation model definition, a fixed service unit allocation model definition or negotiation model definition.

16. The device as claimed in claim 11, wherein the one or more predefined rules comprise a resource allocation optimization algorithm which combines the one or more requests not having a highest classification of a range of classifications to form the highest classification.

17. The device as claimed in claim 11, wherein the at least one user input comprises a number of the one or more resources required or a service type description or a time to complete the one or more requests or combination thereof.

18. The device as claimed in claim 11, wherein the one or more requests are sorted based on a priority value of the one or more requests.

19. The device as claimed in claim 11, wherein the one or more resources are reallocated based on one or more requirements and the priority value of the one or more requests.

20. The device as claimed in claim 11, wherein the magnitude classification model is generated either by using a range based classification or a fuzzy logic.

21. A non-transitory computer readable medium having stored thereon instructions for providing optimum allocation of one or more resources in a composite cloud environment which when executed by a processor, causes the processor to perform steps comprising:

receiving one or more composite cloud service requests from at least one user;

assigning the one or more resources for the one or more requests by determining a total number of the one or more resources required for serving the one or more requests based on one or more predefined rules and at least one user input received along with the one or more requests, wherein the one or more resources comprise manual resources;

measuring real time consumption of the one or more assigned resources for the one or more requests periodically, wherein the real time consumption further comprises a CPU consumption, a disk consumption and a network consumption;

forecasting future consumption of the one or more resources required for serving the one or more requests based on the at least one user input and historical data;

mapping the one or more requests based on the forecast with a combination matrix created based on a number of the one or more resources and number of distribution intervals;

allocating the one or more resources by combining the one or more mapped requests based on the one or more predefined rules, wherein the one or more combined requests at a time consume all the one or more resources available in the composite cloud environment, wherein the one or more predefined rules comprise one or more organization level quota values which set a maximum and minimum number of the one or more resources required for an organization and a priority value of the organization; and deprovisioning the allocated one or more resources based on priorities assigned to the one or more resources until a resource requirement threshold associated with the one or more requests is exceeded.

22. The method as claimed in claim 1, wherein the one or more predefined rules comprise a service level agreement (SLA) description which restricts the one or more service requests from accessing the one or more resources of one or more clouds.

23. The device as claimed in claim 11, wherein the one or more predefined rules comprise a service level agreement (SLA) description which restricts the one or more service requests from accessing the one or more resources of one or more clouds.

* * * * *